United States Patent [19]

Uchino

[11] Patent Number: 4,728,780

[45] Date of Patent: Mar. 1, 1988

[54] HEATING PIPE FOR PANEL HEATERS

[76] Inventor: Eiji Uchino, 4-12, Kamo 2-chome, Takaishi-shi, Oska-pref., Japan

[21] Appl. No.: 882,955

[22] Filed: Jul. 14, 1986

[30] Foreign Application Priority Data

Nov. 25, 1985 [JP] Japan ............................ 60-181638[U]

[51] Int. Cl.[4] .................. H05B 3/06; H01C 1/012; B05D 5/12; B32B 9/00
[52] U.S. Cl. ................................ 219/530; 219/343; 219/457; 219/544; 219/546; 219/552; 338/214; 338/308; 427/58; 427/419.2; 428/384; 428/389; 428/398; 428/404
[58] Field of Search ............... 219/343, 530, 457, 544, 219/546, 552; 338/214, 308; 427/402, 58, 419.2, 101; 428/384, 389, 398, 404

[56] References Cited

U.S. PATENT DOCUMENTS

| 2,905,919 | 9/1959 | Lorch et al. | 338/224 |
| 3,476,916 | 11/1969 | La Van | 219/552 |
| 4,587,402 | 5/1986 | Nishino et al. | 219/343 |

OTHER PUBLICATIONS

Gregg "College Chemistry" 2nd Edition Allyn & Bocow Inc., Boston, Ma, 1965 p. 530.

Primary Examiner—E. A. Goldberg
Assistant Examiner—Gerald E. Preston
Attorney, Agent, or Firm—Harold Gell

[57] ABSTRACT

This invention concerns a heating pipe for panel heaters disclosed on walls, ceilings or floors to heat a room. The pipe is essentially constructed of a pipe itself, an electric heating wire running through it and aluminum granules stuffed between the two. Because of the simple structure, the production, the installment and the maintenance costs are cheap; as a matter of course, there is no additional need of a circulation pump for heating media and safety devices to watch the leak of heating media or the break of the pipe. Moreover, because spherical aluminum granules are closely packed, the heat conductivity is very good, which minimizes the heat loss and reduces the time to heat up a room. Also, the heat capacity is so small that frequency room temperature control by means of an automatic on-and-off mechanism has become possible.

11 Claims, 2 Drawing Figures

HEATING PIPE FOR PANEL HEATERS

This invention relates to a pipe to be incorporated in panel heaters which are used as room heaters, disposed on walls, ceiling or floors.

Conventional pipes of this kind have been designed to circulate steam, hot water or hot oil to heat walls, ceilings or floors. However, those pipes have such a great heat capacity that it takes much time to heat panels. Besides, since the heating depends on the circulation of heated media, the heat loss is considerably greater. Therefore, occasionally it takes as much times as 60–80 minutes, or if not so, it takes at least 10–15 minutes to heat walls, ceilings or floors up to a desired temperature. In view of this, it is impossible to turn on or turn off the panel heaters so frequently as to conserve on the heating cost. Moreover, the heat expansion of a pipe is generally far less than that of water, steam or oil, so that one must take it into account that the pressure inside the pipe increases with a rise in temperature greatly. This inevitably requires us to employ a strong material for a pipe, various safety devices to prevent the leak of heating media or the break of the pipe, as well as a pump to circulate them forcibly; as a result, the production and the installment cost of panel heaters equipped with such pipes increase; in addition, their repair is time-consuming in most cases.

Accordingly, it is an object of this invention to provide a pipe for panel heaters that can instantly transfer the whole heat evolved by an electric heating wire to panels in which the same pipe is embedded directly and efficiently with almost no heat loss. It is another object of this invention to provide a pipe for panel heaters by the mounting of which walls, ceilings or floors can be heated up to a desired temperature in a significantly reduced time and the room temperature control becomes possible with the aid of an automatic action of a thermostat, a thermo-sensor and the like so as to be able to save the room-heating cost. It is still another object of this invention to provide a pipe for panel heaters by the mounting of which conventional safety devices to prevent the leak of heating media or the break of a pipe and a pump to circulate heating media becomes unnecessary; in consequence, the production, installment and maintenance cost of panel heaters can be reduced in a simplest manner.

The above and other objects and features of this invention will appear more fully hereinafter from a consideration of the following description taken in connection with the accompanying drawings wherein one example is illustrated by way of example.

Figure 1:
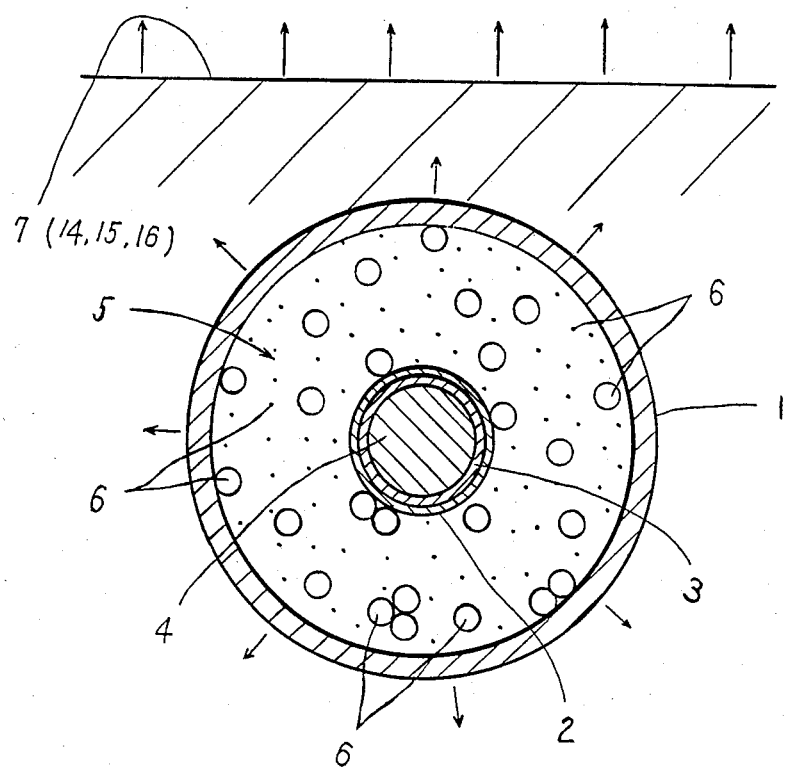
FIG. 1 is an enlarged cross-sectional view of a heating pipe of this invention.

According to FIG. 1, it can be seen that a nickel-chromium (Ni-Cr) electric heating wire 4 covered with stainless 2 and magnesium (Mg) 3 is passed through a copper (Cu) pipe 1 at the axial center thereof. Countless aluminum (Al) granules 6 are stuffed into space 5 left between the Cu pipe and the Ni-Cr wire 4, by which structure electric energy is converted into heat by the wire 4 instantly and the whole heat thus evolved is transferred to the outer pipe 1 by means of the Al granules 6.

It should be noted here that the Al granules are light and very easy to conduct heat; also, they are formed into such a spherical shape that they can be packed very closely, which contributes to the increase of their contact points through which heat can transfer. Meanwhile, because the Al granules can be produced easily from reclaimed empty Al cans, their production cost is not expensive.

Needless to say, the Cu pipe 1 has a very high heat conductivity; at the same time, it can be made so strong enough to be used in piping without trouble.

Figure 2:
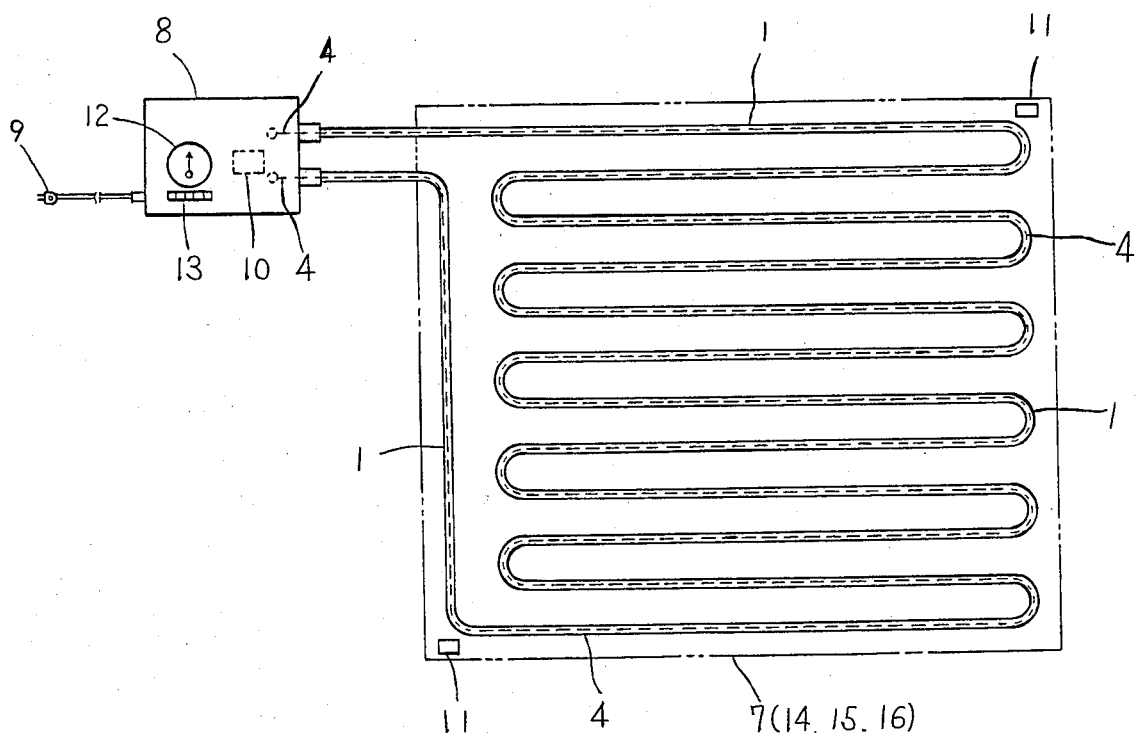
FIG. 2 is an illustration showing one of the examples of this invention actually put to a practical use.

FIG. 2 is an illustration showing the pipe of this invention in practical use, wherein the pipe is embedded in the floor 7 of a room, folded back and forth many times on itself at an appropriate distance. Both its ends are connected to a controller 8 installed outside the room. Heat evolved by the Ni-Cr wire 4 is thus uniformly supplied for the pipe 1 all over the floor 7 by means of the Al granules 6 in order to heat the floor to a comparatively lower temperature, say 26°–50° C. for example. In this way the room is heated by the radiation and the convection air current caused by the heat.

A thermostat which essentially serves as a room temperature control switch 10 is provided to the controller 8 in order to connect or disconnect the Ni-Cr wire 4 to a power source 9 by the output action of a plurality of room temperature control sensors 11, 11. To indicate power consumption, an ammeter 12 and a cumulative counter 13 can also be provided to the controller 8.

In the above example this invention has been described by showing that a pipe 1 holding a Ni-Cr wire 4 is embedded in a floor 7. However, it is of course equally possible to embed a Ni-Cr wire 4 in walls or ceiling of a room. Other than that, a panel heater 16 incorporating the pipe of this invention can be manufacture in such a way that many of the same panel heater 16 can be joined together to form a unit heater that can be laid beneath a carpet or a tatami floor.

As best seen from the above, this invention comprises passing a Ni-Cr wire 4 through a Cu pipe 1 and filling space left between the wire 4 and the pipe with Al granules 6; therefore, heat instantly evolved by the wire 4 can be transferred directly and very efficiently to the pipe 1 through the Al granules 6 with almost no heat loss. The time hitherto required to heat up walls, ceilings or floors of a room is greatly reduced by embedding therein the pipe of this invention; moreover, an automatic on-and-off control of the heating has become possible by the help of a thermostat serving as a room temperature control switch 10; thus, the conservation of the room-heating cost is made in a simplest manner.

Since the heat expansion of a pipe 1 is almost the same as that of aluminum granules 6 in magnitude, the pressure inside the pipe 1 is always maintained constant regardless of a rise in temperature within. Also, the aluminum granules being kept solid in their use, their handling is quite easy; additionally, even a cheap thin-walled pipe can be put to the use with no fear of rupture. Safety devices to prevent heating media from leaking or pipes from breaking are not needed, as well as a pump to circulate heating media. These advantages result in cutting down on the production and the installment cost of panel heaters. Furthermore, it cannot be overlooked that maintenance can be made easily at a lowest expense. In view of all the points mentioned above, it can be said that this invention has succeeded in bringing out every merit of panel heaters, while eliminating every conventional drawback attached thereto.

While preferred embodiments of this invention have been illustrated and described, variations and modifications may be apparent to those skilled in the art. Therefore, I do not wish to be limited thereto and ask that the scope and breadth of this invention be determined from the claims which follow rather than the above description.

What I claim is:

1. A heating apparatus, comprising:
   a pipe;
   an electrical resistive heating element positioned within said pipe; and
   thermally conductive aluminum spheres packed within said pipe between said electrical resistive heating element and the internal wall of said pipe.

2. A heating apparatus as defined in claim 1, wherein the thermal coefficients of expansion of said thermally conductive aluminum spheres and said pipe are within a common range whereby the pressure within said pipe is not affected by temperature changes.

3. A heating apparatus as defined in claim 1, further comprising:
   a thermostat for controlling current flow through said electrical resistive heating element.

4. A heating apparatus as defined in claim 1, further comprising:
   a panel for supporting said heating pipe.

5. A heating apparatus as defined in claim 1, further comprising:
   a panel for supporting said pipe;
   a thermostat for controlling current flow through said electrical resistive heating element; and
   temperature sensing means for controlling said thermostat.

6. A heating apparatus as defined in claim 3, further comprising temperature sensing means positioned adjacent to said heating pipe for controlling said thermostat.

7. A heat producing apparatus, comprising:
   a thermally conductive pipe;
   a nickel-chromium wire positioned within said pipe; and
   aluminum particles packed within said pipe, said aluminum particles filling the space within said pipe between said nickel-chromium wire and the inner wall of said pipe.

8. A heat producing apparatus as defined in claim 7, wherein said thermally conductive pipe is constructed from copper.

9. A heat producing apparatus as defined in claim 8, comprising:
   a thermostat for controlling the amount of heat produced by said nickel-chromium wire.

10. A heat producing apparatus as defined in claim 9, comprising:
    a temperature responsive means for controlling said thermostat.

11. A heating pipe for a panel heater, comprising:
    a pipe;
    an electric heating wire;
    spherical aluminum granules; and
    said electric heating wire being passed through said pipe and said spherical aluminum granules being stuffed into space left between said pipe and said electric heating wire.

* * * * *